United States Patent [19]
Roberts

[11] Patent Number: 5,826,763
[45] Date of Patent: Oct. 27, 1998

[54] APPARATUS FOR ENABLING THE TRANSPORTING OF UNWIELDY LOADS

[76] Inventor: Christopher K. Roberts, 4038 E. 27th St., Tulsa, Okla. 74114

[21] Appl. No.: 928,693

[22] Filed: Sep. 12, 1997

Related U.S. Application Data

[63] Continuation-in-part of Ser. No. 700,235, Aug. 20, 1996, abandoned.

[51] Int. Cl.⁶ ...................................................... A45F 5/00
[52] U.S. Cl. ........................................... 224/270; 224/197
[58] Field of Search ................................... 224/191, 197, 224/199, 200, 270, 271, 272

[56] References Cited

U.S. PATENT DOCUMENTS

| | | | |
|---|---|---|---|
| 2,490,279 | 12/1949 | Nunamaker . | |
| 2,651,441 | 9/1953 | Rau et al. . | |
| 2,685,757 | 8/1954 | Mirigian | 224/270 |
| 3,638,843 | 2/1972 | Ortynski | 224/199 |
| 3,672,548 | 6/1972 | Mavrakis | 224/199 |
| 4,534,063 | 8/1985 | Krumin et al. | 224/199 |
| 4,638,530 | 1/1987 | Perry . | |
| 4,901,898 | 2/1990 | Colombo et al. . | |
| 4,962,873 | 10/1990 | Schattel . | |
| 5,014,891 | 5/1991 | King . | |
| 5,207,791 | 5/1993 | Scherbarth . | |
| 5,332,136 | 7/1994 | Rudolph . | |
| 5,456,394 | 10/1995 | Israel . | |
| 5,477,997 | 12/1995 | Weatherly . | |
| 5,511,706 | 4/1996 | Hendrickson . | |
| 5,511,707 | 4/1996 | Reichert . | |

*Primary Examiner*—Allan N. Shoap
*Assistant Examiner*—Gregory M. Vidovich
*Attorney, Agent, or Firm*—Head, Johnson & Kachigian

[57] ABSTRACT

A device for assisting in carrying unwieldy loads comprising first and second members held together by a pin about which the second member is pivotal. The first member being a longitudinal C-channel frame designed to be worn about a belt in vertical alignment with the body of a wearer and the second member being a foldable platform storable in the longitudinal frame when in a first vertical position. The second member being rotatable outward from the C-channel frame about the pin and coming to a rest second position when a bottom end of the second member is flush against the back of the C-channel. In the second position, the second member will be nearly perpendicular to the frame, thus forming a platform upon which unwieldy loads may be rested.

3 Claims, 2 Drawing Sheets

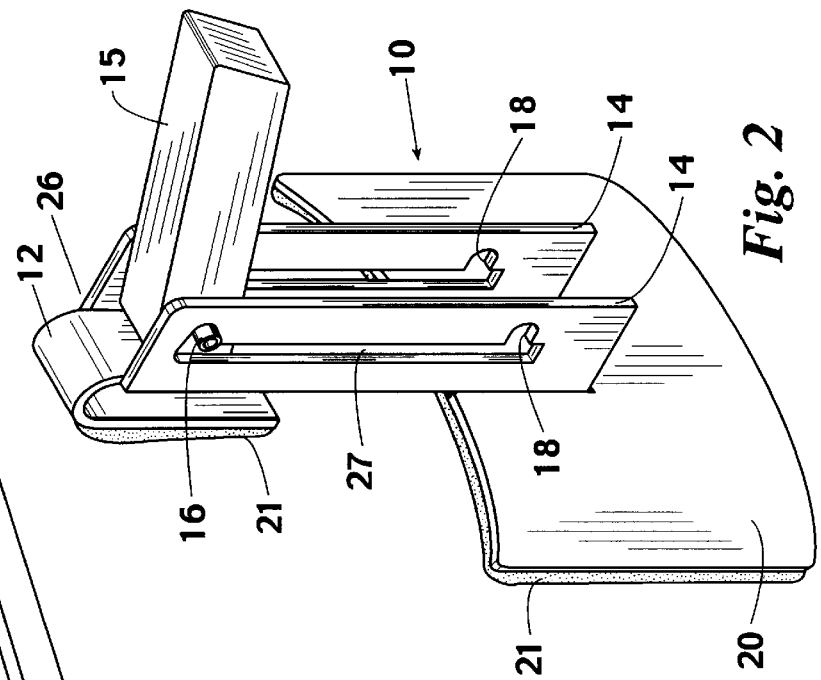
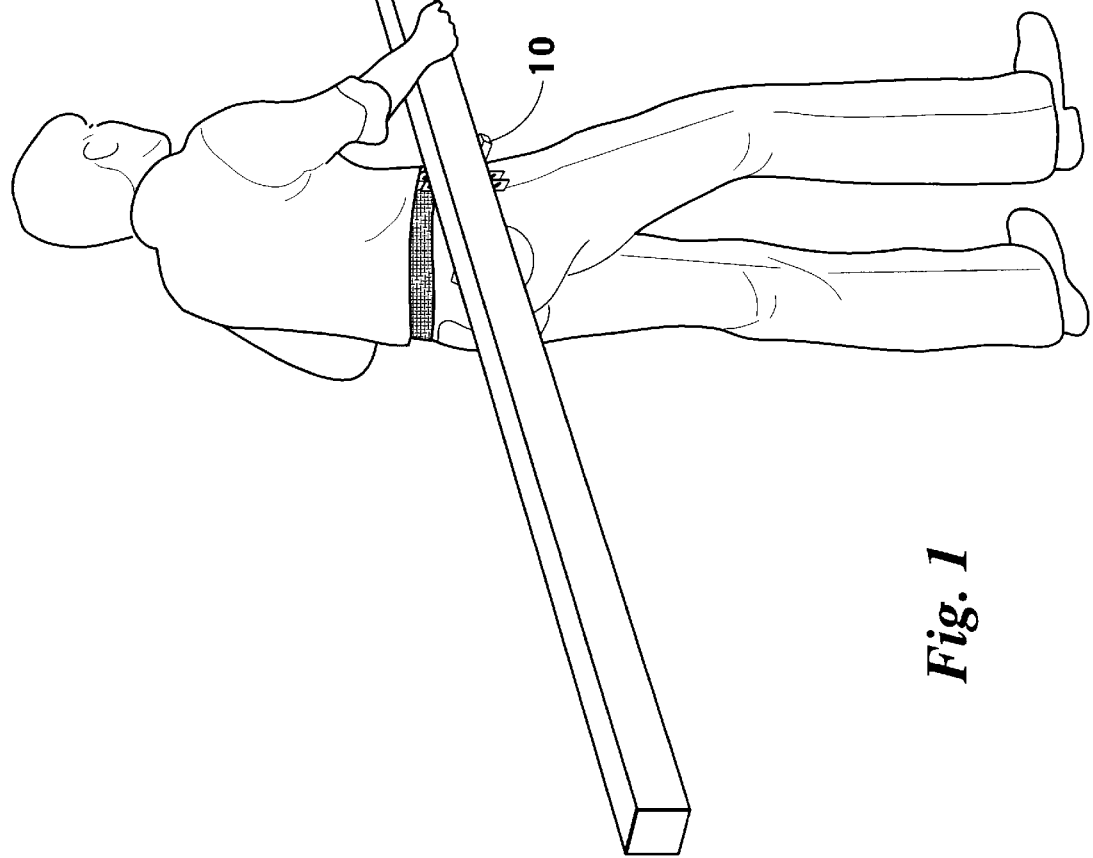

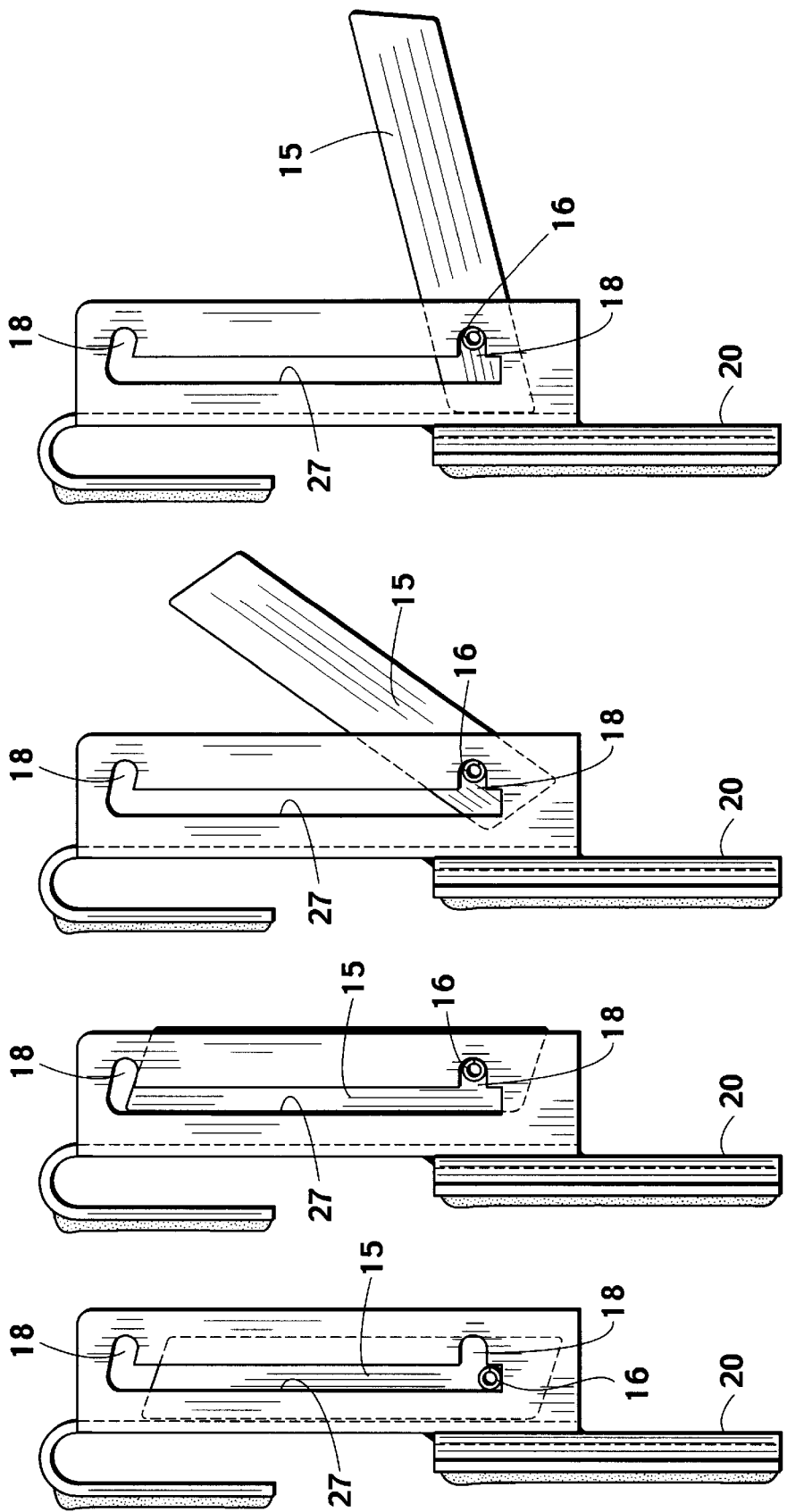

APPARATUS FOR ENABLING THE TRANSPORTING OF UNWIELDY LOADS

CROSS-REFERENCE TO THE EXISTING APPLICATION

This is a Continuation-In-Part of application No. 08/700,235 filed Aug. 20, 1996, now abandoned, entitled "An Apparatus for Enabling the Transport of Unwieldy Loads".

CROSS-REFERENCE TO MICROFICHE APPENDIX

This application is not referenced in any microfiche appendix.

SUMMARY OF THE INVENTION

This invention describes an apparatus for enabling the transportation of unwieldy loads, particularly loads such as lumber, re-bar, pipe or other typically elongated materials typically encountered in construction trades. Workmen presently moving such materials must use both hands to lift, support and balance such loads as they are moved about the construction site.

The device is designed to be attached to a belt normally worn by workmen, or could be attached to a separate belt specifically for the purpose. The device provides a platform against which the unwieldy load can rest, thus providing both support and balance, allowing the carrier better use of his hands, and preventing potential injury in attempting such a carry by merely leaning the unwieldy objects against the hip.

An additional feature of this device is its small size and adaptability. The platform on which the carried load is intended to be rested, may be folded through a 90° C. angle so that it fits flush within the device, thus presenting a thin bulge on the belt similar to a hunting knife or other small attachment. In this way the present invention overcomes previously known belt mounted load support devices such as the one described by Israel in U.S. Pat. No. 5,456,394.

SUMMARY OF THE INVENTION

The present invention describes a device, which is basically made up of two pieces, a frame or bracket with a folded over portion by which it may be mounted over a belt, and a moveable support arm, which in its closed or rest position is mounted vertically within the frame or bracket, and which moveable support arm may be rotated outward from the support bracket to provide a platform against which the load to be carried may be positioned, thus easing the difficulty in transporting the load.

Unwieldy loads, in particular such items as lengthy pieces of lumber, reinforcing bars, pipes and the like, are difficult to carry, both due to their size and weight. Individuals in carrying such loads have a tendency to rest or lean the load against the top of one's hip bone thus putting stress on the spine. Repetitive stress could be injurious to people who may have to carry such unwieldy loads on a regular basis.

The invention is intended to overcome such potential hazards and at the same time improve the ease and efficiency of transporting such loads, thus making the individual more productive.

The device is intended to be mounted on a standard tool belt or a special workman support belt provided with auxiliary suspenders for support. The device would be worn to one's side and in the open position provide a platform against which the unwieldy load may be rested. In this manner the carrier's body is kept straight, thus alleviating potential stress from sidewise bending of the spine, and both hands are free to support and balance the load.

The device is relatively small, weighing less than a pound, in the preferred embodiment. The device is unobtrusive when worn in the closed position, and may readily be flipped to the open position providing a support platform for the load.

The frame or bracket is preferably made of steel or other strong material. The bracket is designed such that it has two wings extending outward perpendicular to the base. The base is intended to be parallel to the wearer's body, the longer dimension aligned vertically with the wearer. Within each wing is a vertical slot and a number of horizontal slots opening outward and approximately perpendicular from the vertical slot, all to allow the foldable arm to be rotated e.g. resting in a stowed vertical position parallel to the wearer's body, or in an open horizontal position. The slots are symmetrically aligned in each of the opposite wings of the bracket, to allow the placement of the support arm at various levels for maximum comfort and ease for the wearer and load carrier. The bottom of the vertical slot extends below the lowest horizontal slot to prevent the support arm from rotating outward when thus positioned.

The support arm is installed within the space formed by the bracket, being kept in that space by means of a pin inserted through a hole in one end of the support arm and extending outward beyond the outside edge of the bracket wings. By lifting the support arm and causing the pin to move outward into one of the side slots, the support arm will rotate outward about the axis of the pin, and come to rest when the end of the support arm is flush against the back of the bracket. To prevent the possibility of the support arm rotating past 90° C., the end of the support arm is cut not at 90° C. but at a slight angle away from 90° C.

The support arm may be designed in differing shapes or configurations to optimize the ease with which it may support different loads. The foldable arm may be of universal design or may be such as to support particular loads e.g. steel reinforcing bars, two by four construction lumber, etc. or it may even be used as a support unto which specialized support means may be attached such as a padded arm or seat when carrying small children. Another version may be adapted for use by hunters and designed to be attached to a hunting vest, where it would serve as a rest while transporting a hunting weapon.

A better understanding of the invention will be obtained from the following description of the preferred embodiments, taken in conjunction with the attached drawings.

DETAILED DESCRIPTION OF THE DRAWINGS

FIG. 1 shows the device in use by a workman carrying lumber, the device itself being partially obscured by the load.

FIG. 2 shows a perspective view of the device with the support arm in the open position.

FIG. 3 shows the support arm outside the device.

FIG. 4A–4D show the position of the support arm in the closed and in the open position.

DETAILED DESCRIPTION OF THE PREFERRED EMBODIMENTS

FIG. 1 shows the device 10, as worn by a person and partially hidden by the beam the person is carrying. The device is attachable to a belt, preferably a separate tool belt or work belt for this purpose. In FIG. 2, the device 10 is shown in perspective, with the support arm 15 folded out. The device is mounted onto a wearer's tool belt by means of the sleeve 12 which fits over the belt.

As shown in FIG. 2, the bracket portion 26 of the device is in the shape of a vertical C-channel with its open ends outward of the wearer. Along each side or wing 14 of the C-channel there is a vertical slot 27 extending the major portion of the vertical length of each side 14 of the bracket. The vertical slot 14 has one or more horizontal slots 18 extending outward from the vertical slot. Note that these horizontal slots 18 may extend from the vertical at the top or in the middle portion but preferably not from the very bottom of the vertical slot 27. In this way when the support arm is in its closed or non-use position, the pin extension 16 will slide to the bottom of the vertical slot 27, and it will essentially lock in place, and not inadvertently allow the support arm 15 to rotate outward. In the preferred embodiment there are two horizontal slots, one high and one low.

When the device 10 as shown in FIG. 2 is not being used to support a load being carried, it is normally suspended over the wearer's belt by the sleeve 12, such that the bracket wings 14 are outward of the wearer and the support arm 15 is folded in a vertical position between the bracket wings 14 as shown in FIG. 4A. Due to its small size, the device 10 does not impede any other activity of the wearer. In the preferred embodiment it would extend about one inch outward in the closed position and about four inches outward in the open position and be about 2.5 inches wide. If desired the device may be readily removed from the belt and stowed in a pocket or tool box. When a load is to be carried the support arm 15 is lifted upward until the pin 16 may be moved into one of the horizontal slots 18, whereupon the support arm will rotate outward about the pin 16 in the slot 18, of the bracket wings 14, such that the support arm extends outward from the wearer. Once the support arm pin 16, is in any of the outward slots 18 a slight tip outward will cause it to rotate, coming to rest at approximately 90° C. from vertical when the lower end of the support arm 24 is flush against the inside of the bracket.

The end of the support arm 24 is not perpendicular to the longer axis of the support arm to ensure that the support arm cannot rotate through or beyond 90° C.

A contoured support panel 20 is attached to the bottom rear of the bracket The support panel is lightly curved to fit conformably to the carrier's body and keeps the device from shifting its position along the wearer's belt while loads are being carried. The support panel may be attached to the bracket by any secure means. In the preferred embodiment the securing means is by welding and the support panel is made of steel or other such sturdy material. The outside surface of said support panel 20, that is, the surface adjacent to the wearer's body may have a soft material 21 attached thereto for comfort. This same soft surface may also be attached to the surface of the clip or sleeve 12. In one preferred embodiment the support panel is about 2½" wide while the width between the wings of the device is in the order of three quarters of an inch. The wings extend outward about ¾ of an inch. The vertical height of the bracket is about 5" in the preferred embodiment although it may be of varying sizes. The support arm is intended to extend outward about 4" to 4½" when in the open position in the preferred embodiment. The support arm may be designed for other lengths for specialized conditions. The support panel may be designed of other sturdy material e.g. metal and may be of different sizes.

The bracket wings 14 have a vertical slot 27 and one or more horizontal cutouts 18, which allow for positioning of the support arm 15 within alternate slots; one end of the support arm 15, which is within the bracket wings 14, has a rod 16 extending the width of the support arm and beyond on either side of said bracket wings. The rod extensions or pins 16 are situated within the cutouts of the bracket wings 14 and allow the support arm to be locked in either the stowed or the open position. In the open position the support arm is folded outward such that it extends horizontally away from the wearer. As shown in FIG. 2, there may be a plurality of slots or cut outs 18 in each of the two wings 14 of the bracket which allows for the positioning of the support arm 15 at different levels along the vertical axis of the bracket. In the preferred embodiment there would be two such positions.

As shown in the detail of the support arm 15 in FIG. 3, the support arm has a uniform thickness throughout its length. The bracket end 24, is cut at a slight angle from the perpendicular, and the support arm is sufficiently thick to allow space for the mounting rod 16 and to allow the force of the load being carried on the support arm to be distributed to the device. The mounting rod 16 is designed to be removable allowing for the installation of different designs of support arm. The attachment of the mounting rods may be by any well known means including cotter pins. In the preferred embodiment the mounting rod 16 is a spring pin. The support arm shown is one designed for use when carrying beams such as two by four lumber. Differing design of support arms, which are interchangeable within the device, may be provided to improve the ease of transporting other unwieldy loads. When carrying steel reinforcing bars or pipe, a support arm that has a curvature, with a low point mid-point of the horizontal axis of the support arm when in the extended position, would aid in keeping the round load from rolling off.

A smaller version of the device may be used by hunters and attachable to a hunting vest to help carry a hunting weapon.

With the device in the open position platforms with means to slip over the support arm may be used for specialized purposes. One such use could be a small padded chair type surface such as a toddler's tricycle seat which could be slipped over the support arm in the open position to assist in carrying small children.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A device for assisting in carrying unwieldy loads, said device comprising first and second members held together by a pin about which said second member is pivotal, said device first member being a longitudinal frame designed to be worn about a belt in vertical alignment with the body of a wearer and the second member being a foldable platform storable in said longitudinal frame;

said frame comprises a C-channel with a top end, a bottom end, a back, and two sides wherein said sides are parallel to each other and extend outwardly from opposing vertical edges of said back, said sides each having a longitudinal slit opening along a vertical axis of said side with one or more small slots extending away from the longitudinal slit opening and away from said back of said C-channel, said one or more small slots being located along the slit opening at any convenient position except at the very bottom of said longitudinal slit opening;

said second member comprising a beam member of a size to fit conformably inside the C-channel, said beam member having a front, a back, two sides, a top end, and a bottom end, said beam member having a hole through it near said bottom end through which said pin is inserted, said pin being a spring pin and extending outward at both sides of said beam member and through said slit openings in said sides of said C-channel, each of said beam member's top end and bottom end being at an angle which slopes away from a plane defined by the surface of said back or said front of said beam member, said beam member resting in essentially a vertical first position aligned with the vertical axes of said sides of said C-channel in which it is stored in said C-channel and held in place by said pin, said pin being movable along said vertical slit openings onto one of said slots in each of said sides of said C-channel wherein said beam member is then capable of rotating outward from said C-channel about said pin and coming to a rest second position when said bottom end of said beam member is flush against the back of said C-channel, in said second position, said beam member will be nearly perpendicular to the frame, thus forming a platform upon which unwieldy loads may be rested;

said back of said C-channel further having an extension which extends from the top end thereof, said extension forming an inverted U-shaped loop engageable with the belt of a wearer such that the device may be slipped over the belt of the wearer; and said bottom end of said C-channel having a slightly curved plate attached to and extending therefrom, said curved plate curved to fit conformably to the body of the wearer to provide a means to keep the device from shifting its position along the belt of the wearer when attached thereto.

2. A device as described in claim 1 wherein said beam member is configured such that a seating surface for supporting small children may be attached thereto.

3. A device as described in claim 1, wherein said curved plate attached to said bottom end of said C-channel as well as said extension at said top end of said C-channel, each have soft padding material attached thereto to provide comfort where said device is in contact with the wearer's body.

\* \* \* \* \*